United States Patent

[11] 3,607,182

[72] Inventor Howard A. Leibowitz
Big Flats, N.Y.
[21] Appl. No. 58,900
[22] Filed July 29, 1970
[45] Patented Sept. 21, 1971
[73] Assignee Corning Glass Works
Corning, N.Y.

[54] METHOD AND APPARATUS FOR REMOVAL OF BUBBLES FROM SHEET GLASS OVERFLOW FORMING SURFACES
10 Claims, 3 Drawing Figs.

[52] U.S. Cl. .................................................. 65/53,
65/83, 65/98, 65/195
[51] Int. Cl. ....................................................... C03b 17/00
[50] Field of Search ........................................... 65/53, 83, 98, 195

[56] References Cited
UNITED STATES PATENTS
1,673,907 6/1928 Ferngren ...................... 65/53
1,734,964 11/1929 Danner ......................... 65/98 X
3,149,949 9/1964 Dockerty et al. ............. 65/53

Primary Examiner—Arthur D. Kellogg
Attorneys—Clarence R. Patty, Jr. and Burton R. Turner ABSTRACT: A heated evacuation system is applied to the junction between upper and lower blocks forming a two-part overflow sheet-drawing apparatus, to remove seed and bubbles which may be trapped at outer edge portions of such junction where they tend to cause streaks or other optical distortions in the sheet glass produced by such apparatus. A vacuum is applied to a heated accumulator which is connected to a slot formed at the junction between the upper and lower blocks by a heated conduit, to withdraw molten glass containing seed or bubbles into such slot and through the heated conduit into the accumulator where it is maintained in a molten condition for either continuous or periodic removal therefrom.

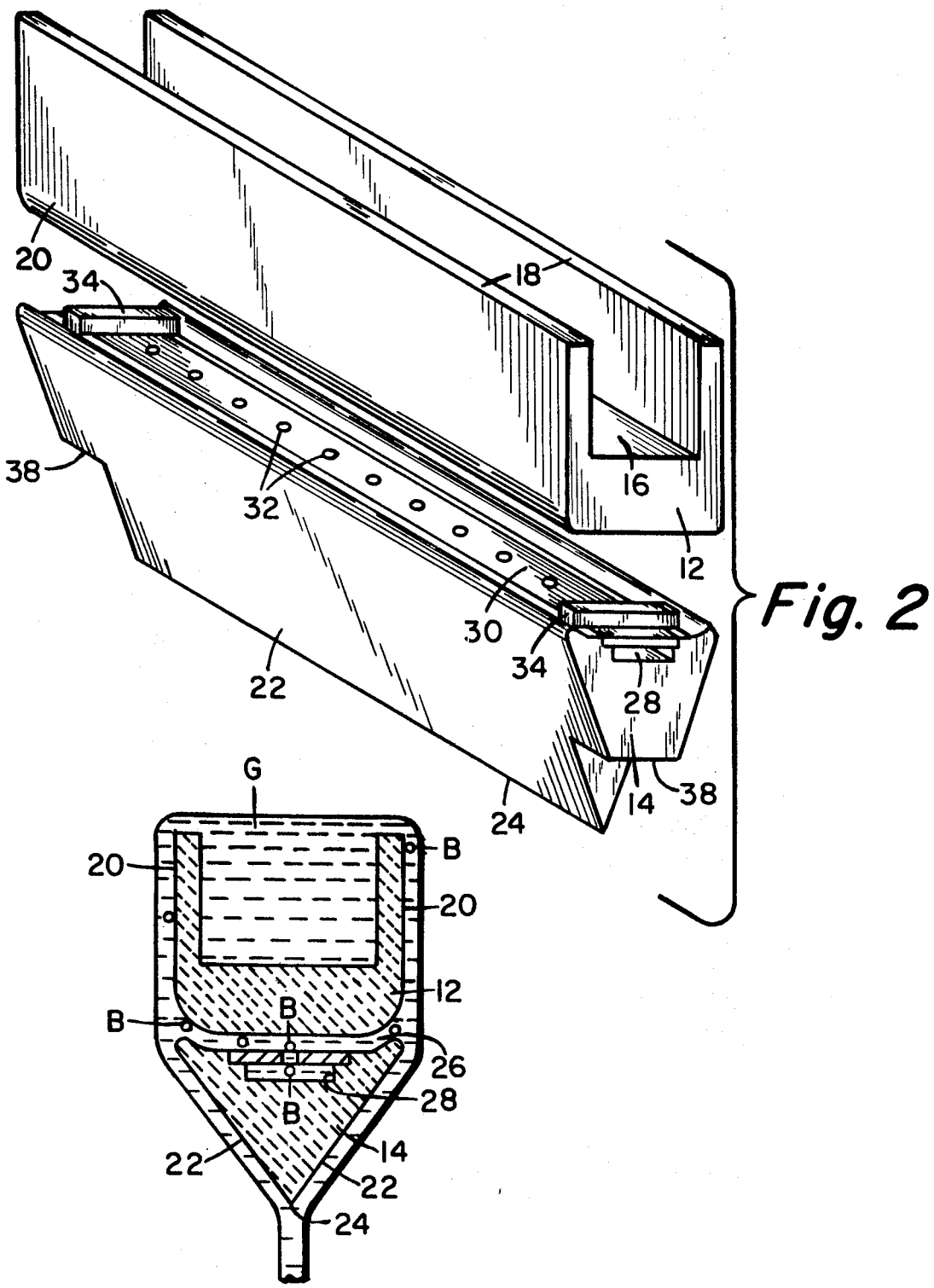

METHOD AND APPARATUS FOR REMOVAL OF BUBBLES FROM SHEET GLASS OVERFLOW FORMING SURFACES

BACKGROUND OF THE INVENTION

In the past it has been known to utilize two-part sheet-glass-forming apparatus wherein an upper blocklike part forms an overflow trough and a lower blocklike part is of a wedge shape for forming downwardly moving opposed flows of molten glass into a single sheet. However, apparently the prior art was not even aware that certain streaks and optical distortions occasioned with the use of two-part forming apparatus were due to the entrapment of bubbles between the upper and lower portions of the two-part apparatus. As a result, no efforts were made in the past to remove such trapped bubbles from between the two-part system, since they were either not known to exist or were not deemed to be the cause of the streaking or optical distortion problem.

As shown in U.S. Pat. No. 1,673,907 which is representative of an early form of a two-part sheet-drawing apparatus, the upper overflow through trough block was separated from the lower sheet-forming block a distance sufficient to permit the entrapment of air bubbles along the upper edge of the lower member. In a like manner, U.S. Pat. No. 1,891,370 illustrates a two-part sheet-glass-forming apparatus having an elongated upper slab provided with a trough, and a lower forming wedge loosely secured thereto to compensate for thermal expansion and contraction. Such construction, however, inherently entraps seed or bubbles which generate streaks or other optical distortions in the finished glass product. It appears that burners, directed at the junction between the upper and lower blocks, may have been used in an endeavor to compensate for streaks and other optical distortions which may have been caused by bubbles entrapped at such junction.

The present invention obviates the problems encountered with the prior art devices by providing a vacuum system for drawing glass and entrapped bubbles into a slot formed at the junction between the upper and lower portions of the two-part sheet-forming apparatus, and for removing the molten glass containing such bubbles from the forming apparatus through a heated conduit to an accumulator, wherein the molten glass is maintained in a molten condition for either continuous or periodic discharge.

SUMMARY OF THE INVENTION

A two-part overflow sheet-drawing apparatus is provided with an evacuation system for removing bubbles which may collect at the junction between the upper and lower portions of the sheet-forming apparatus. An upper portion of the apparatus in the form of an overflow trough block is supported upon a lower portion comprising a forming wedge block by means of a plurality of support pads, which may be positioned intermediate longitudinal end portions of the forming wedge block. The support pads not only function to positionably retain the upper overflow trough block on the lower forming wedge block, but also to separate the blocks and thereby provide a slot for the flow of molten glass therebetween and provide compensation for any deformation in the blocks which may be occasioned by differential expansion.

A channel is formed in at least one of the block members so as to communicate with the slot along its longitudinal extent. Preferably the channel communicates with the slot through metering means which compensates for pressure drop along the length of the channel, and thereby provides for the uniform evacuation of bubbly glass along the length of the slot. The metering means may merely be in the form of a cover plate for the channel having a plurality of sized holes spaced along the longitudinal length thereof. A heated conduit, defining a confined path, extends between one end of the channel and an accumulator or container for accumulating molten glass and bubbles extracted from the slot. The accumulator, which is also heated to maintain the glass in a molten condition, is connected adjacent its upper extent to a suitable source of vacuum, and is provided with a drain outlet adjacent its lower extent for either continuous or intermittent discharge of the molten glass accumulated therein.

Molten glass is fed to the overflow trough block in any suitable manner such as shown in the previously cited prior art patents, and as also shown therein, the molten glass overflows the trough and runs downwardly along opposite sides of the sheet-forming apparatus wherein the separate flows unite at the bottom of the wedge block to form a single sheet. It has been found that bubbles have a tendency to collect at the junction between the upper and lower blocks which cause streaks or other optical distortions in the subsequently produced sheet. However, with the present invention, a vacuum is applied centrally of the slot and the bubbles trapped at the outside edge of the slot are drawn into the slot, together with the surrounding molten glass in which the bubbles exist. The vacuum source is connected to the accumulator and is applied to the slot through the heated conduit, channel and metering means. The bubbly glass is then drawn into the channel and through the heated conduit to the accumulator.

The evacuation of the slot may either be continuous or intermittent as may be required by the bubble conditions. When a continuous operation is employed the temperature of the molten glass in the accumulator outlet is adjusted to provide a desired glass viscosity so that a continuous discharge from the accumulator is obtained which is commensurate with the inlet flow from the heated conduit as controlled by the vacuum source. However, when intermittent operation is desired, the molten glass in the accumulator may be periodically drained by intermittently freezing and melting glass in the outlet drain.

It thus has been an object of the present invention to provide novel method and apparatus for eliminating streaks and other optical distortions in newly formed sheet glass produced by a two-part overflow apparatus, by removing bubbles which may accumulate at the junction of such parts through the use of a heated evacuation system applied to the slot formed at such junction.

BRIEF DESCRIPTION OF THE DRAWINGS

FIG. 2 is an exploded perspective view of a two-part overflow sheet-forming apparatus showing the evacuation channel and metering means communicating with the slot formed between the upper and lower portions of the apparatus.

FIG. 3 is a cross-sectional view in elevation taken along line 3—3 of FIG. 1, and illustrating the downward flow of molten glass over the two-part apparatus to form a single sheet, and the collection of bubbly glass within the slot and evacuation channel.

DESCRIPTION OF THE PREFERRED EMBODIMENTS

Figure 1:
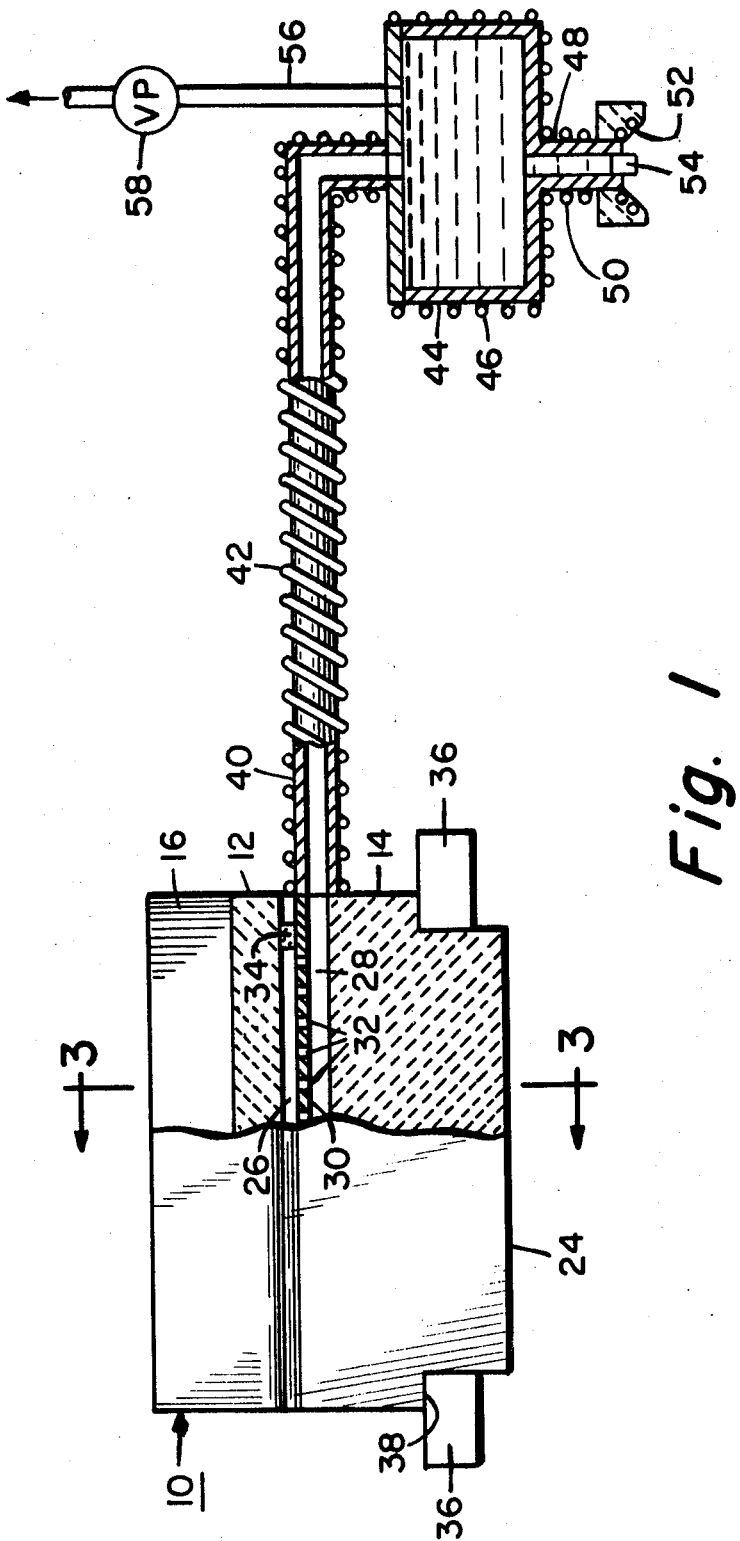
FIG. 1 is a somewhat schematic elevational view, partially in section, illustrating a heated evacuation system embodying the present invention as applied to a two-part overflow glass-sheet-forming apparatus.

Referring now to the drawings, a two-part overflow glass-sheet-forming apparatus 10 is shown having an upper overflow trough block 12 and a lower forming wedge block 14. The upper portion 12 of the glass-forming apparatus 10 has a longitudinally extending trough 16 for overflowing molten glass over upper edge surfaces 18 and down opposed sidewall portions 20. Suitable dams or end blocks as shown in the prior art are utilized to direct the flow along a desired length of the overflow trough.

The lower portion 14 of the glass-forming apparatus 10 has a pair of downwardly converging sidewall portions 22 which unite at the lowermost edge or root 24 of the forming wedge block 14 to form a glass draw line. The upper surface of the forming wedge block 14 is preferably recessed as shown to form a slot 26 at the junction between the upper and lower blocks 12 and 14 respectively. An evacuation channel 28 is formed longitudinally along the upper surface of the forming wedge block 14 in communication with the slot 26. The communication between the evacuation channel and the slot is preferably metered along its extent by any suitable means such as cover plate 30 having a plurality of openings or passages 32 extending therethrough along its longitudinal extent. A plurality of support pads 34 are shown intermediate the ends of the glass-forming apparatus 10 between upper portion 12 and lower portion 14 for positionably supporting the upper overflow trough block 12 upon the lower forming wedge block 14. In addition, a pair of supporting blocks or piers 36, as are known in the prior art, are shown supporting the lower forming wedge block 14 within undercut portions 38.

A heated conduit 40 having electric resistant heating elements or windings 42 thereabout, communicates between one and of evacuation channel 28 and an accumulator 44. The accumulator is also provided with suitable heating units such as electric heating elements 46, to maintain the glass retained therein in a fluid condition. A drain tube 48 communicates with the bottom of the accumulator 44 and is also provided with electric windings of heating elements 50. In addition a radiant heater 52 is provided adjacent the lower end of the drain tube 48 for maintaining molten glass discharged therefrom in a fluid condition. As shown, a mechanical stopper or plug 54 may initially be provided in the bottom of the drain tube 48 to seal the accumulator so that a vacuum may be drawn thereon and a desired quantity of molten glass retained therein. Although the conduit 40 and accumulator 44 may, if desired, be positioned within a suitable heated muffle, preferably the temperature of the conduit 40, accumulator 44, and drain tube 48 are individually controlled by separately regulated windings 42, 46, and 50. An evacuation tube 56, communicating with the upper portion of the accumulator 44 is connected to any source of regulated vacuum such as vacuum pump 58 so as to apply a desired degree of vacuum to the accumulator.

In operation, molten glass G delivered to trough 16 overflows upper edges 18 and flows downwardly along opposed sidewall portions 20 and downwardly converging sidewall portions 22 to root 24, where the separate flows are united and withdrawn as a single sheet. When initially starting the system, it is necessary to provide a mechanical stopper 54 in the bottom of the drain tube 48 in order that a vacuum may be obtained within the accumulator by means of the vacuum pump 58 through vacuum tube 56. As shown particularly in FIG. 3, any bubbles B which may be formed or trapped in the molten glass G flow downwardly along the opposed sidewalls 20 and collect adjacent outer edges of the slot 26 formed at the junction between the upper overflow trough block 12 and the lower forming wedge block 14. These bubbles, if not removed, have a tendency to form streaks and other optical distortions in the resulting sheet glass drawn from the root or draw line 24. However, the vacuum applied to the sealed accumulator 44 by the vacuum pump, is in turn applied to the slot 26 through a confined path by means of evacuation channel 28 and heated conduit 40. As a result, molten glass containing bubbles B is drawn from the outside edges of the slot towards the center and through the holes or openings 32 in cover plate 30 downwardly into evacuation channel 28 and along heated conduit 40 into the accumulator 44.

If a periodic application of the vacuum is desired to remove the deleterious bubbles, the vacuum may be continued until the accumulator is nearly full of molten glass. The vacuum means is then turned off and the electric windings 50 about the drain tube 48 energized to heat the tube and melt any glass which may be frozen therein. In addition the mechanical plug 54 is removed from the bottom of the drain tube and the radiant heater element 52 is energized to maintain the discharging stream in a fluid state. When the accumulator is nearly empty, both the electric heating element 50 about the drain tube 48 and the radiant heater 52 are deenergized so as to cool the drain tube and solidify the glass remaining therein to form a seal. Of course fluid cooling such as air may be applied to the exterior of the drain tube if more rapid freezing of the glass is desired. The vacuum is then reapplied and the procedure repeated until any streak suspected as being caused by trapped bubbles in the slot disappears. Further draining of the accumulator, however, will merely require the energizing of heating elements 50 and 52 since the mechanical plug is no longer required. Heating elements 42 surrounding heated conduit 40 and elements 46 about accumulator 44 are maintained in an energized state during the entire operation so as to maintain the glass withdrawn from the slot in a fluid condition for delivery to and retention within the accumulator.

When a continuous operation is desired, the accumulator is initially sealed and partially filled with molten glass in the manner previously stated. However, after the mechanical plug is removed from the drain tube, the power applied by windings 50 and 52 is controlled to obtain a desired glass viscosity in conjunction with the vacuum applied by pump 58 to regulate glass pull, so as to maintain a continuous flow of molten glass from the accumulator while maintaining a constant level of molten glass therein necessary to provide an effective seal for the applied vacuum. Although the heated conduit 40 is shown communicating with only one end of the evacuation channel 28, with the other end being closed to the atmosphere, a pair of such heated conduits may be applied to opposite ends of the evacuation channel if desired. Also, the metering passages 32 in cover plates 30 are preferably programmed in size so as to provide a uniform vacuum along the length of the slot 26 and compensate for pressure drop along channel 28. However, if desired a cover plate may be provided with a continuous opening and the width of the channel programmed so as to compensate for such pressure drop. The glass forming apparatus 10 may be made of any suitable known glass refractory, such as Corhart number 1148 high alumina refractory. Further, the cover plate, heated conduit and the accumulator may be made of refractory metal material such as platinum or platinum-rhodium alloy.

ALthough by no means limiting in nature, the following specific embodiment of the process and apparatus is set forth herebelow for explaining the mode of operation. Utilizing a two-part glass-forming apparatus having a length of approximately 6 feet and made of a high alumina refractory, molten glass was continuously fed to the overflow trough at a temperature of approximately 1.170° C. and at a rate of about 1,700 pounds per hour so that a continuous sheet of molten glass at about 300,000 poises was drawn from the root of the forming apparatus at a speed of about 50 inches per minute. The lower forming wedge block had an evacuation channel about 4 inches wide and 1 inch deep extending along the longitudinal length of its upper surface and in communication with the slot formed between the upper and lower parts of the apparatus. A cover plate having a plurality of ⅜-inch-diameter holes spaced about 1½ inches apart along its longitudinal extent served as a metering means between the slot and the channel. The power to the windings about the heated conduit, extending from one end of the evacuation channel to the accumulator, was controlled so as to heat the conduit to about 1,200° C. Further, the windings about the accumulator were separately regulated to supply a temperature of about 1,705° C. No power was applied to the windings about the drain tube or to the radiant heater.

When the vacuum was first applied to the unit to initially draw glass into the slot for evacuating bubbles, the vacuum source applied to the accumulator was regulated to only 30 inches of water until the molten glass reached the accumulator. After the molten glass began to accumulate in the accumulator, indicating that the slot evacuation channel and heated conduit were full of molten glass, the vacuum pump means was regulated to apply a vacuum of about 100 inches of water to the accumulator. When the molten glass level within the accumulator reached within about 1 inch of the top, the vacuum was turned off and the mechanical plug removed from the bottom of the drain tube. In addition, the winding about the drain tube was energized as well as the radiant heater so as to melt the glass in the drain area and permit the draining of the accumulator. Also the windings about the accumulator were separately controlled to increase their applied temperature to about 1,250° C. so as to decrease the viscosity of the glass retained therein and facilitate the draining of the accumulator. When the level of the molten glass reached about 1 inch from the bottom of the accumulator, the windings about the drain tube and the radiant heater were turned off so as to freeze the remaining glass therein and form a seal in the drain tube. Also the windings about the accumulator were regulated so as to reduce the amount of heat input to about 1,175° C.

Although the power applied to the heated conduit and accumulator in the example maintained the viscosity of the glass therein between about 20,000 and 25,000 poises, it will be apparent to those skilled in the art that the flow rate obtainable within the vacuum system will be dependent upon the viscosity of the glass, which in turn is inversely proportional to the temperature applied thereto. Accordingly, flow rates may vary over wide ranges with increased flow rates in the vacuum system being obtainable with softer glasses and at substantially lower temperatures.

Since the conduit and the accumulator are heated by separately controlled and regulated windings, the glass drawn from the slot is maintained in a molten condition, not only during withdrawal from the slot area, but also during those interim periods wherein no bubbly glass may exist at the slot area, and accordingly no vacuum is required for its removal. However, should streaks or optical distortions again occur due to the entrapment of bubbles at the slot area, the vacuum may be reapplied to the accumulator at the full 100 inches of water since there is no problem of collapsing the conduit or distorting the slot area when the system is full of molten glass. The process may be repeated as required, however, since the mechanical plug is no longer utilized after initial drainage, the drain tube is opened by merely energizing the windings and radiant heater thereabout.

Although the now preferred embodiments of the invention have been disclosed, it will be apparent to those skilled in the art that various changes and modifications may be made thereto without departing from the spirit and scope of the invention as defined in the following claims.

1. A method of eliminating streaks and optical distortions from molten sheet glass formed on a two-part overflow sheet-forming apparatus having a slot formed between the two parts which comprises, applying a vacuum to said slot and drawing molten glass containing bubbles along edge portions of said slot centrally within such slot, flowing such extracted molten glass along a confined path, accumulating the molten glass in a container adjacent the end of said confined path, maintaining the glass within said confined path and said container in a molten condition, and regulating the applied vacuum to controllably discharge the accumulated glass from a bottom portion of the container.

2. A method as defined in claim 1 including the steps of periodically discontinuing the application of the vacuum, applying heat to a bottom drain portion of the container while the vacuum is discontinued to drain accumulated glass from the container, and cooling and solidifying molten glass in such drain portion to seal the container for reapplication of the vacuum to again draw additional glass through the confined path for accumulation within the container.

3. A method as defined in claim 1 including the steps of continuously draining accumulated glass from said container, and regulating the rate of such discharge flow by simultaneously controlling glass viscosity by the amount of heat applied to a bottom drain portion of the container and glass pull by the degree of applied vacuum.

4. A method as defined in claim 1 wherein said vacuum is applied centrally along said slot to equally draw molten glass inwardly from opposite side edges thereof, and the amount of vacuum applied longitudinally along said slot is metered to compensate for pressure drop and thereby provide a substantially uniform vacuum longitudinally therealong.

5. Apparatus for eliminating streaks and optical distortion from sheet glass formed on a two-part overflow sheet-forming apparatus having an upper overflow trough portion positioned upon a lower forming wedge portion with a slot formed therebetween along their longitudinal extent which comprises: channel means formed in one of said portions for longitudinal communication with said slot, accumulator means positioned in spaced relationship with respect to said slot, conduit means communicating between said accumulator means and one end of said channel means; means for applying a vacuum to said slot through said channel means, said conduit means, and said accumulator means for withdrawing molten glass from edge portions of said slot through said channel means and conduit means into said accumulator means; means for supplying separately controlled heat to said conduit means and said accumulator means for maintaining the glass extracted from said slot in a molten condition; and means for controllably draining molten glass from said accumulator means.

6. Apparatus as defined in claim 5 including metering means positioned between said channel means and said slot for proportioning the vacuum longitudinally along the slot to compensate for pressure drop and thus provide a substantially uniform vacuum therealong.

7. Apparatus as defined in claim 6 wherein said metering means comprises a cover plate for said channel means, and a plurality of programmed openings extend through said plate along the longitudinal extent thereof metering the vacuum applied to the slot.

8. Apparatus as defined in claim 5 wherein said means for controllably draining molten glass from said accumulator means includes a drain tube in communication with a lower portion of said accumulator means, an independently controllable winding surrounding said drain tube for applying heat thereto, and radiant heater means for applying heat to a lower portion of said drain tube and molten glass discharged therefrom.

9. Apparatus as defined in claim 5 wherein said means for applying a vacuum to said slot is connected to an upper portion of said accumulator means.

10. Apparatus as defined in claim 5 wherein said channel means is formed in an upper surface of said lower forming wedge portion and extends substantially along the longitudinal extent of said slot, and said channel means is closed at one end and in open communication at the other end with said conduit means.